US012718806B2

(12) United States Patent
Koneru et al.

(10) Patent No.: US 12,718,806 B2
(45) Date of Patent: Aug. 25, 2026

(54) SYSTEMS AND METHODS FOR CONVERSATION ORCHESTRATION USING FINE-TUNED LARGE LANGUAGE MODELS

(71) Applicant: KORE.AI, INC., Orlando, FL (US)

(72) Inventors: Rajkumar Koneru, Windermere, FL (US); Prasanna Kumar Arikala Gunalan, Hyderabad (IN); Santhosh Kumar Myadam, Hyderabad (IN); Thirupathi Bandam, Hyderabad (IN); Girish Ahankari, Hyderabad (IN)

(73) Assignee: KORE.AI, INC., Orlando, FL (US)

( * ) Notice: Subject to any disclaimer, the term of this patent is extended or adjusted under 35 U.S.C. 154(b) by 140 days.

(21) Appl. No.: 18/582,984

(22) Filed: Feb. 21, 2024

(65) Prior Publication Data

US 2024/0281619 A1 Aug. 22, 2024

Related U.S. Application Data

(60) Provisional application No. 63/447,274, filed on Feb. 21, 2023.

(51) Int. Cl.
*G10L 15/183* (2013.01)
*G06F 40/40* (2020.01)

(52) U.S. Cl.
CPC ............ *G10L 15/183* (2013.01); *G06F 40/40* (2020.01)

(58) Field of Classification Search
USPC ............................................ 704/7–10, 257
See application file for complete search history.

(56) References Cited

U.S. PATENT DOCUMENTS

| | | | | |
|---|---|---|---|---|
| 11,632,341 | B2 * | 4/2023 | Wang | H04L 51/02 709/206 |
| 2022/0270164 | A1 * | 8/2022 | Mehra | G06Q 20/20 |
| 2023/0074406 | A1 * | 3/2023 | Baeuml | G06F 16/90332 |
| 2023/0169273 | A1 * | 6/2023 | Koneru | G06F 40/30 704/9 |
| 2023/0197070 | A1 * | 6/2023 | Byrne | G10L 13/02 704/235 |
| 2024/0176958 | A1 * | 5/2024 | Raimondo | G06N 3/0455 |
| 2024/0194180 | A1 * | 6/2024 | Goldshtein | H04L 51/02 |

* cited by examiner

*Primary Examiner* — Leonard Saint-Cyr
(74) *Attorney, Agent, or Firm* — Troutman Pepper Locke LLP

(57) ABSTRACT

A virtual assistant server determines one or more use cases of one or more utterances received from one or more customer devices. The virtual assistant server executes one or more dialog flows corresponding to the one or more use cases of the one or more utterances, where the executing comprises providing one or more inputs to a fine-tuned large language model comprising: use case context, customer context, conversation context, business rules, and exit conditions. The virtual assistant server receives one or more outputs corresponding to the one or more inputs from the fine-tuned large language model, and determines one or more responses based on the one or more outputs. Subsequently, the virtual assistant server provides the one or more responses to the one or more customer devices.

15 Claims, 8 Drawing Sheets

FIG. 4B

SYSTEMS AND METHODS FOR CONVERSATION ORCHESTRATION USING FINE-TUNED LARGE LANGUAGE MODELS

This application claims the benefit of U.S. Provisional Patent Application Ser. No. 63/447,274, filed Feb. 21, 2023, which is hereby incorporated by reference in its entirety.

FIELD

This technology generally relates to virtual assistants, and more particularly to methods, systems, and computer-readable media for conversation orchestration using fine-tuned large language models.

BACKGROUND

Conversational artificial intelligence (AI) systems have become a popular customer touchpoint because of the ease of interaction they offer. Customers can converse with enterprise specific custom virtual assistants in natural language and resolve their issues or find the answers to their queries.

The development and deployment of conversational AI systems includes creating and managing custom virtual assistants. This is a skilled exercise and comprises heavy development costs and lengthy timelines. Large teams including business analysts, language experts, conversation designers, developers and testers are required to develop and deploy a custom virtual assistant. Rigorous development and testing, which often takes months, is required to develop the custom virtual assistant which converses satisfactorily with customers.

The existing custom virtual assistants are not adept at handling human-like complex conversations. Whereas general virtual assistants using a large language model (LLM), such as ChatGPT, engage the users in natural and fluid conversations. However, unlike custom virtual assistants, a general virtual assistant using the LLM cannot handle enterprise specific use cases.

In particular, each enterprise within one of a plurality of types of enterprises may have its own particular business rules. For example, each pizza chain may have its own business rules including, for example, types of pizza bases, toppings, pizzas only available in specific sizes, add-ons offered for specific types of orders, or the like. The general virtual assistants using LLMs do not have the capability to understand such particular business rules or configurations resulting in a less desirable conversational experience for both the enterprises and their customers. Hence, there is a need to create custom virtual assistants for enterprises which can leverage LLMs to provide human-like conversation experiences to the customers.

SUMMARY

In an example, the present disclosure relates to a method for configuring a virtual assistant which uses a fine-tuned large language model to provide responses to customer utterances. The method comprises: determining, by the virtual assistant server, one or more use cases of one or more utterances received from one or more customer devices and executing one or more dialog flows corresponding to the one or more use cases of the one or more utterances, wherein the executing comprises providing one or more inputs to a fine-tuned large language model comprising: use case context, customer context, conversation context, business rules, and exit conditions. Further, the virtual assistant server receives one or more outputs corresponding to the one or more inputs from the fine-tuned large language model and determines one or more responses based on the one or more outputs. The virtual assistant server provides the one or more responses to the one or more customer devices.

In another example, the present disclosure relates to a virtual assistant server comprising one or more processors and a memory. The memory coupled to the one or more processors which are configured to execute programmed instructions stored in the memory to determine one or more use cases of one or more utterances received from one or more customer devices and execute one or more dialog flows corresponding to the one or more use cases of the one or more utterances, wherein the executing comprises providing one or more inputs to a fine-tuned large language model comprising: use case context, customer context, conversation context, business rules, and exit conditions. Further, one or more outputs corresponding to the one or more inputs are received from the fine-tuned large language model and one or more responses are determined based on the one or more outputs. Subsequently, the one or more responses are provided to the one or more customer devices.

In another example, the present disclosure relates to a non-transitory computer readable storage medium storing thereon instructions which when executed by one or more processors, causes the one or more processors to determine one or more use cases of one or more utterances received from one or more customer devices and execute one or more dialog flows corresponding to the one or more use cases of the one or more utterances, wherein the executing comprises providing one or more inputs to a fine-tuned large language model comprising: use case context, customer context, conversation context, business rules, and exit conditions. Further, one or more outputs corresponding to the one or more inputs are received from the fine-tuned large language model and one or more responses are determined based on the one or more outputs. Subsequently, the one or more responses are provided to the one or more customer devices.

BRIEF DESCRIPTION OF THE DRAWINGS

FIG. 4B illustrates example inputs configured at the "collect information" node of the dialog flow of FIG. 4A.

DETAILED DESCRIPTION

Examples of the present disclosure relate to a virtual assistant server environment and, more particularly, to one or more components, systems, computer-readable media and methods for orchestrating a conversation using fine-tuned LLMs. The virtual assistant server environment enables one or more developers or one or more administrators of enterprises operating one or more developer devices to, by way of example, design, develop, deploy, manage, host, or analyze virtual assistants. A virtual assistant server of the virtual assistant server environment is configured to orchestrate natural language conversations. The one or more developers at the one or more developer devices may configure and train the virtual assistants to converse with the customers of the enterprises in natural language. The one or more developers may use different graphical user interfaces (GUIs) provided by the virtual assistant server to configure, train, and/or test the virtual assistants. The virtual assistant server provides a unified interface for the one or more developers at the one or more developer devices to train use cases, entities, or the like, configured for the virtual assistants.

Figure 1:
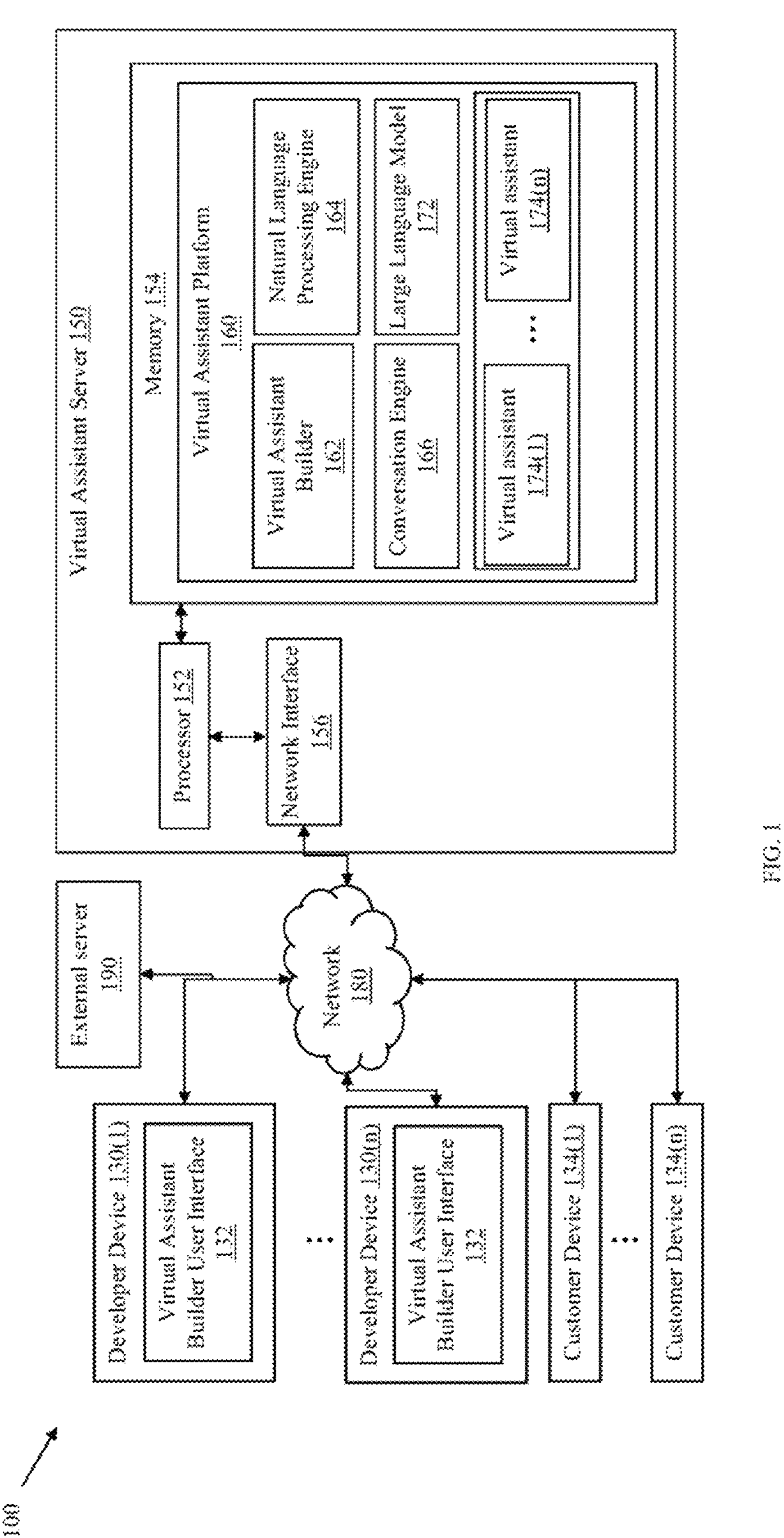
FIG. 1 is a block diagram of an exemplary virtual assistant server environment for implementing the concepts and technologies disclosed herein.

FIG. 1 is a block diagram of an exemplary virtual assistant server environment 100 for implementing the concepts and technologies disclosed herein. The environment 100 includes: one or more developer devices 130(1)-130(*n*), one or more customer devices 134(1)-134(*n*), an external server 190, and a virtual assistant server 150 coupled together via a network 180, although the environment 100 can include other types and numbers of systems, devices, components, and/or elements and in other topologies and deployments. While not shown, the exemplary environment 100 may additionally comprise: databases, cloud based or on premise servers, network components, such as routers, switches and other devices, which are well known to those of ordinary skill in the art and thus will not be described here.

The one or more developer devices 130(1)-130(*n*) may communicate with the virtual assistant server 150 via the network 180. The one or more developers at the one or more developer devices 130(1)-130(*n*) may access and interact with the functionalities exposed by the virtual assistant server 150 via the one or more developer devices 130(1)-130(*n*). The one or more developer devices 130(1)-130(*n*) may include any type of computing device that can facilitate user interaction, for example, a desktop computer, a laptop computer, a tablet computer, a smartphone, a mobile phone, a wearable computing device, or any other type of device with communication and data exchange capabilities. The one or more developer devices 130(1)-130(*n*) may include software and hardware capable of communicating with the virtual assistant server 150 via the network 180. Also, the one or more developer devices 130(1)-130(*n*) may render and display the information received from the virtual assistant server 150. By way of example, the one or more developer devices 130(1)-130(*n*) may, based on the information received from the virtual assistant server 150, render and display an interface used to configure one or more virtual assistants. The one or more developer devices 130(1)-130(*n*) and the virtual assistant server 150 may communicate via one or more application programming interfaces (APIs) or one or more hyperlinks exposed by the virtual assistant server 150, although other types and/or numbers of communication methods may be used in other configurations.

Also, the one or more developer devices 130(1)-130(*n*) render and display data received from the virtual assistant server 150 in a virtual assistant builder user interface. The one or more developer devices 130(1)-130(*n*) may run applications, such as web browsers or virtual assistant software, which may render the virtual assistant builder user interface, although other types and/or numbers of applications may render the virtual assistant builder user interface in other configurations. In one example, the one or more developers at the one or more developer devices 130(1)-130(*n*) may, by way of example, make selections, provide inputs using the virtual assistant builder user interface or interact, by way of example, with data, icons, widgets, or other components displayed in the virtual assistant builder user interface.

The one or more customer devices 134(1)-134(*n*) may comprise one or more processors, one or more memories, one or more input devices such as a keyboard, a mouse, a display device, a touch interface, and/or one or more communication interfaces, which may be coupled together by a data/communication bus or other link, although the one or more customer devices 134(1)-134(*n*) may comprise other types and/or numbers of other systems, devices, components in other configurations. The customers accessing the one or more customer devices 134(1)-134(*n*) provide utterances (e.g. in text, voice, or the like) to the virtual assistant server 150, although the utterances may be provided in other types and/or numbers of modes in other configurations. The virtual assistant server 150 provides responses to the utterances using the virtual assistants. In one example, the virtual assistant server 150 communicates with the external server 190 to provide responses to the utterances.

The external server 190 may create, host, or manage LLMs. The external server 190 may create, host, or manage fine-tuned LLMs based on training provided by the one or more developers at the one or more devices 130(1)-130(*n*). The external server 190 may be a cloud-based server or an on-premise server. The fine-tuned LLMs may be deployed using the external server 190 and can be accessed through APIs for use in applications.

The virtual assistant server 150 includes a processor 152, a memory 154, and a network interface 156, although the virtual assistant server 150 may include other types and/or numbers of components in other configurations. In addition, the virtual assistant server 150 may include an operating system (not shown). In one example, the virtual assistant server 150, one or more components of the virtual assistant server 150, and/or one or more processes performed by the virtual assistant server 150 may be hosted, managed and/or implemented as part of a networking environment (e.g., cloud computing environment). By way of example, the capabilities of the virtual assistant server 150 may be offered as a service using the cloud computing environment.

The components of the virtual assistant server 150 may be coupled by a graphics bus, a memory bus, an Industry Standard Architecture (ISA) bus, an Extended Industry Standard Architecture (EISA) bus, a Micro Channel Architecture (MCA) bus, a Video Electronics Standards Association (VESA) Local bus, a Peripheral Component Interconnect (PCI) bus, a PCI-Express (PCIe) bus, a serial advanced technology attachment (SATA) bus, a Personal Computer Memory Card Industry Association (PCMCIA) bus, an Small Computer Systems Interface (SCSI) bus, or a combination of two or more of these, although other types and/or numbers of buses may be used in other configurations.

The processor 152 of the virtual assistant server 150 may execute one or more computer-executable instructions stored in the memory 154 for the methods illustrated and described with reference to the examples herein, although the processor may execute other types and numbers of instructions and perform other types and numbers of operations. The processor 152 may comprise one or more central processing units (CPUs), or general-purpose processors with a plurality of processing cores, such as Intel® processor(s), AMD® processor(s), although other types of processor(s) could be used in other configurations.

The memory 154 of the virtual assistant server 150 is an example of a non-transitory computer readable storage medium capable of storing information or instructions for the processor 152 to operate on. The instructions, which when executed by the processor 152, perform one or more of the disclosed examples. In one example, the memory 154 may be a random access memory (RAM), a dynamic random access memory (DRAM), a static random access memory (SRAM), a persistent memory (PMEM), a nonvolatile dual in-line memory module (NVDIMM), a hard disk drive (HDD), a read only memory (ROM), an erasable programmable read-only memory (EPROM), an electrically erasable programmable read-only memory (EEPROM), a programmable ROM (PROM), a flash memory, a compact disc (CD), a digital video disc (DVD), a magnetic disk, a universal serial bus (USB) memory card, a memory stick, or a combination of two or more of these. It may be understood that the memory 154 may include other electronic, magnetic, optical, electromagnetic, infrared or semiconductor based non-transitory computer readable storage medium which may be used to tangibly store instructions, which when executed by the processor 152, perform the disclosed examples. The non-transitory computer readable medium is not a transitory signal per se and is any tangible medium that contains and stores the instructions for use by or in connection with an instruction execution system, apparatus, or device. Examples of the programmed instructions and steps stored in the memory 154 are illustrated and described by way of the description and examples herein.

As illustrated in FIG. 1, the memory 154 may comprise a virtual assistant platform 160 and include instructions corresponding to the virtual assistant platform 160 of the virtual assistant server 150, although other types and/or numbers of instructions in the form of programs, functions, methods, procedures, definitions, subroutines, or modules may be stored. The memory 154 may also include data structures storing information corresponding to the virtual assistant platform 160. The virtual assistant server 150 receives communication from the one or more developer devices 130(1)-130(*n*) and uses the virtual assistant platform 160 to enable configuration of virtual assistants based on the communication. The virtual assistant server 150 also receives communication from the one or more customer devices 134(1)-134(*n*) of the enterprise customers and uses the virtual assistant platform 160 to provide a response to the communication.

The virtual assistant platform 160 comprises instructions, configuration, or data corresponding to a virtual assistant builder 162, a natural language processing (NLP) engine 164, a conversation engine 166, a large language model (LLM) 172, and one or more virtual assistants 174(1)-174(*n*), although other types and/or numbers of instructions, configuration, or data in the form of programs, functions, methods, procedures, definitions, subroutines, modules, or structured or unstructured text, may be stored. Examples of the steps or functions performed when the programmed instructions stored in the memory 154 are executed are illustrated and described by way of the figures and description associated with the examples herein.

The virtual assistant builder 162 of the virtual assistant platform 160 may be served from and/or hosted on the virtual assistant server 150 and may be accessible as a website, a web application, or a software-as-a-service (SaaS) application. Enterprise users, such as the developers, system administrators, or business analysts by way of example, may access the functionality of the virtual assistant builder 162, for example, using web requests, application programming interface (API) requests, although the functionality of the virtual assistant builder 162 may be accessed using other types and/or numbers of methods in other configurations. The one or more developers at the one or more developer devices 130(1)-130(*n*) may design, create, configure, train, deploy, test, re-configure, or optimize the one or more virtual assistants 174(1)-174(*n*) using a virtual assistant builder user interface 132 (hereinafter referred to as virtual assistant builder UI 132) provided by the virtual assistant builder 162. In one example, the functionality of the virtual assistant builder 162 may be exposed as the virtual assistant builder UI 132 rendered in a web page in a web browser accessible using the one or more developer devices 130(1)-130(*n*), such as a desktop or a laptop by way of example. The one or more developers at the one or more developer devices 130(1)-130(*n*) may interact with user interface (UI) components, such as windows, tabs, or icons of the virtual assistant builder UI 132 rendered in the one or more developer devices 130(1)-130(*n*), to create the one or more virtual assistants 174(1)-174(*n*).

The one or more developers at the one or more developer devices 130(1)-130(*n*) may use the UI components, code, or a combination of these provided in the virtual assistant builder UI 132 to create, deploy, or manage the one or more virtual assistants 174(1)-174(*n*). After the one or more virtual assistants 174(1)-174(*n*) are deployed, the customers of the enterprise may communicate with the one or more virtual assistants 174(1)-174(*n*) to, for example, purchase products, raise complaints, access services provided by the enterprise, or to know information about the services offered by the enterprise. Each virtual assistant of the one or more virtual assistants 174(1)-174(*n*) may be configured with one or more use cases for handling customer utterances and each of the one or more use cases may be further defined using a dialog flow. In one example, each of the one or more virtual assistants 174(1)-174(*n*) or dialog flows of the one or more virtual assistants 174(1)-174(*n*) may be configured using other methods, such as software code in other configurations.

The virtual assistant builder 162 described herein may be, by way of example, a low-code no-code platform and may be integrated with different application platforms such as enterprise applications, Software-as-a-Service applications and/or development platforms or development tools or components thereof already existing in the marketplace, e.g., Facebook® Messenger, Microsoft® Bot Framework, third-party LLM platforms such as Open AI through APIs by way of example.

The NLP engine 164 assists the virtual assistant server 150 with natural language understanding and natural language generation. The NLP engine 164 may incorporate technologies or capabilities including—machine learning, semantic rules, component relationships, neural networks, rule-based engines, or the like. The NLP engine 164 interprets one or more utterances received from the one or more customer devices 134(1)-134(*n*), to identify one or more use cases of the one or more utterances or one or more entities in the one or more utterances, and generates one or more responses to the one or more utterances. A use case of an utterance refers to the intention of a customer—that describes what the customer wants the virtual assistant to do. The entities are, for example, parameters, fields, data, or words required by the virtual assistant to fulfill the use case. For example, in the utterance—"Book me a flight to Orlando for next Sunday," the use case is "Book flight", and the entities are "Orlando" and "Sunday."

The NLP engine 164 also creates and executes language models corresponding to the one or more virtual assistants 174(1)-174(*n*). In one example, the language models classify the one or more utterances into one or more use cases configured for the one or more virtual assistants 174(1)-174(*n*) based on the configuration and/or training added to the one or more virtual assistants 174(1)-174(*n*) using the virtual assistant builder 162, although other types and/or numbers of functions may be performed by the language models in other configurations. Also, the NLP engine 164 may use one or more pre-defined and/or custom-trained language models. The language models may be machine learning models, rule-based models, predictive models, neural network based models, semantic models, component relationship based models, large language models, or artificial intelligence based models, although there may be other types and/or numbers of language models in other configurations. In one example, the virtual assistant server 150 may determine, based on a configuration or in real-time, when to use the language models created by the NLP engine 164 and when to use a large-language model 172 (hereinafter referred to as LLM 172) created, hosted, and/or managed by the virtual assistant server 150 or by the external server 190.

The conversation engine 166 orchestrates the conversations between the one or more customer devices 134(1)-134(*n*) and the virtual assistant server 150 by executing the one or more virtual assistants 174(1)-174(*n*) that are configured by the one or more developers at the one or more developer devices 130(1)-130(*n*). The conversation engine 166 may perform state management of each conversation managed by the virtual assistant server 150, although the conversation engine 166 may perform other types and/or numbers of functions in other configurations. In one example, the conversation engine 166 may be implemented as a finite state machine that uses states and state information to orchestrate conversations between the one or more customer devices 134(1)-134(*n*) and the virtual assistant server 150. The conversation engine 166 may also manage the context of a conversation between the one or more customer devices 134(1)-134(*n*) and the one or more virtual assistants 174(1)-174(*n*) managed and hosted by the virtual assistant server 150. Further, the conversation engine 166 may manage digressions or interruptions provided by the one or more customer devices 134(1)-134(*n*) during the conversations with the virtual assistant server 150. The conversation engine 166 may communicate with the NLP engine 164, the LLM 172, the one or more virtual assistants 174(1)-174(*n*), or other components of the virtual assistant server 150 to orchestrate conversations with the customers. In one example, the conversation engine 166 and the NLP engine 164 may be configured as a single component.

The LLM 172 is a machine learning model that is used to process large amounts of natural language data for tasks such as natural language processing, text mining, text classification, machine translation, and question answering. The LLM 172 typically uses deep learning or neural networks to learn language features from large amounts of data. The LLM 172 is usually trained on a large dataset and then used to generate predictions or generate features from unseen data. The LLM 172 can be used to generate language features such as word embeddings, part-of-speech tags, named entity recognition, sentiment analysis, or the like. In one example, the LLM 172 may be hosted by the external server 190, and the virtual assistant server 150 may communicate with the external server 190 using application programming interfaces (API's) to access the features of the LLM 172, although other types and/or numbers of communication methods may be used in other configurations. Although FIG. 1 illustrates a single LLM 172, it may be understood that the virtual assistant environment may comprise one or more LLMs.

The LLM 172 can generate use cases labels from one or more conversations or utterances by leveraging natural language processing (NLP) techniques. The LLM 172 can use a variety of techniques such as part-of-speech (POS) tagging, dependency parsing, named entity recognition (NER), and semantic analysis to understand the use case and the context of the one or more conversations or utterances. By using these techniques, the LLM 172 can identify the underlying use case of the one or more conversations or utterances and then generate the corresponding use case labels, such as, for example, "check balance," "transfer funds," "make payment," or other possible use cases.

The virtual assistant server 150 may create enterprise specific fine-tuned large language models by fine-tuning the LLM 172 using training inputs, although the fine-tuned large language models may be created by fine-tuning other types and/or numbers of large language models. In one example, the virtual assistant server 150 may provide the training inputs or other such information to the external server 190, and the external server 190 creates, hosts, and manages the fine-tuned large language models based on the training inputs or other information provided by the virtual assistant server 150. In one example, one fine-tuned large language models may be created for an enterprise, and all the virtual assistants of the enterprise may communicate with the fine-tuned large language models to provide responses to the customers. In another example, one fine-tuned large language models may be created for each virtual assistant of the enterprise, as illustrated below in FIG. 2C.

For creating each of the one or more virtual assistants 174(1)-174(*n*), the developer using the virtual assistant server 150 may provide one or more dialog flows or training inputs such as, for example, use case labels, out-of-domain use case labels, one or more utterances corresponding to each use case label, business rules, domain knowledge, description of one or more entities, conversation rules comprising: flow rules, digression rules, or the like, nodes for, for example, service calls, maintaining states, context, or the like. The developer may provide such inputs in the form of text, structured text, code, or the like.

The one or more virtual assistants 174(1)-174(*n*) comprise virtual assistant configuration, fine-tuned large language models, or other information either provided by the developer or created by the virtual assistant server 150 or the external server 190. Based on the training inputs provided by the developer for each of the one or more virtual assistants 174(1)-174(*n*), the external server 190 may create a fine-tuned LLM for each of the one or more virtual assistants 174(1)-174(*n*). The virtual assistant server 150 may provide utterances to each of the fine-tuned large language models and receive responses from each of the fine-tuned large language models.

The virtual assistant server 150 may communicate with one or more enterprise applications, external databases or customer relationship management (CRM) software to retrieve customer information to provide responses to customers. In one example, the one or more enterprise applications, databases or the CRM software may be hosted by the virtual assistant server 150.

The network interface 156 may include hardware, software, or a combination of hardware and software, enabling the virtual assistant server 150 to communicate with the components illustrated in the environment 100, although the network interface 156 may enable communication with other types and/or number of components in other configurations. In one example, the network interface 156 provides interfaces between the virtual assistant server 150 and the network 180. The network interface 156 may support wired or wireless communication. In one example, the network interface 156 may include an Ethernet adapter or a wireless network adapter to communicate with the network 180.

The network 180 enables the one or more developer devices 130(1)-130(*n*), the one or more customer devices 134(1)-134(*n*), the external server 190 or other external systems to communicate with the virtual assistant server 150. The network 180 may be, for example, an ad hoc network, an extranet, an intranet, a wide area network (WAN), a virtual private network (VPN), a local area network (LAN), a wireless LAN (WLAN), a wireless WAN (WWAN), a metropolitan area network (MAN), internet, a portion of the internet, a portion of the public switched telephone network (PSTN), a cellular telephone network, a wireless network, a Wi-Fi network, a worldwide interoperability for microwave access (WiMAX) network, or a combination of two or more such networks, although the network 180 may include other types and/or numbers of networks in other topologies or configurations.

The network 180 may support protocols such as Session Initiation Protocol (SIP), Hypertext Transfer Protocol (HTTP), Hypertext Transfer Protocol Secure (HTTPS), Media Resource Control Protocol (MRCP), Real Time Transport Protocol (RTP), Real-Time Streaming Protocol (RTSP), Real-Time Transport Control Protocol (RTCP), Session Description Protocol (SDP), Web Real-Time Communication (WebRTC), Transmission Control Protocol/Internet Protocol (TCP/IP), User Datagram Protocol (UDP), or Voice over Internet Protocol (VOIP), although other types and/or numbers of protocols may be supported in other topologies or configurations. The network 180 may also support standards and/or formats such as, for example, hypertext markup language (HTML), extensible markup language (XML), voiceXML, call control extensible markup language (CCXML), JavaScript object notation (JSON), although other types and/or numbers of data, media, and document standards and formats may be supported in other topologies or configurations. The network interface 156 of the virtual assistant server 150 may include any interface that is suitable to connect with any of the above-mentioned network types and communicate using any of the above-mentioned network protocols.

Figure 2A:
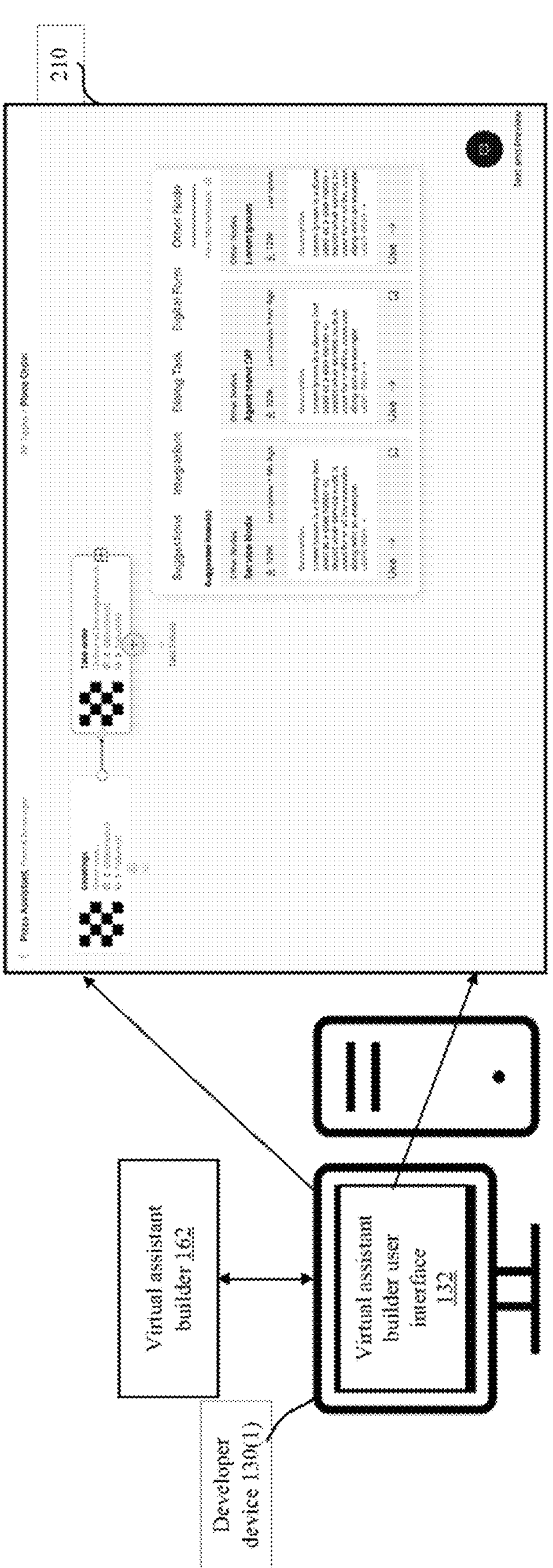
FIG. 2A is an example screenshot of a virtual assistant builder user interface.

FIG. 2A is an example screenshot from the virtual assistant builder UI 132 for displaying a virtual assistant configuration, for example, in the developer device 130(1). The developer device 130(1) may display the example screenshot in the virtual assistant builder UI 132 based on instructions or information received from the virtual assistant server 150. In this example, the screenshot 210 corresponds to a pizza ordering virtual assistant created using the virtual assistant builder UI 132, although other types and/or numbers of information may be displayed in the virtual assistant builder UI 132 in other configurations. The screenshot 210 illustrates at least part of a dialog flow of the use case "place order" comprising a plurality of nodes: greeting, collect information (e.g. take order node), and other suggested nodes to complete the dialog flow such as, for example, service node, agent transfer, or the like. Upon detection of the "place order" use case, the virtual assistant server 150 executes the dialog flow of the "place order" use case, although there may be other types and/or numbers of dialog flows associated with the "place order" use case in other configurations. One or more of these nodes may be used to configure the information provided to a fine-tuned large language model 176 (hereinafter referred to as fine-tuned LLM 176) or to request information from the fine-tuned LLM 176 in one or more pre-defined formats. The virtual assistant server 150 may provide the configured information as prompts to the fine-tuned LLM 176. It may be understood that the developers may create other types and/or numbers of virtual assistants using the virtual assistant builder UI 132.

Figure 2B:
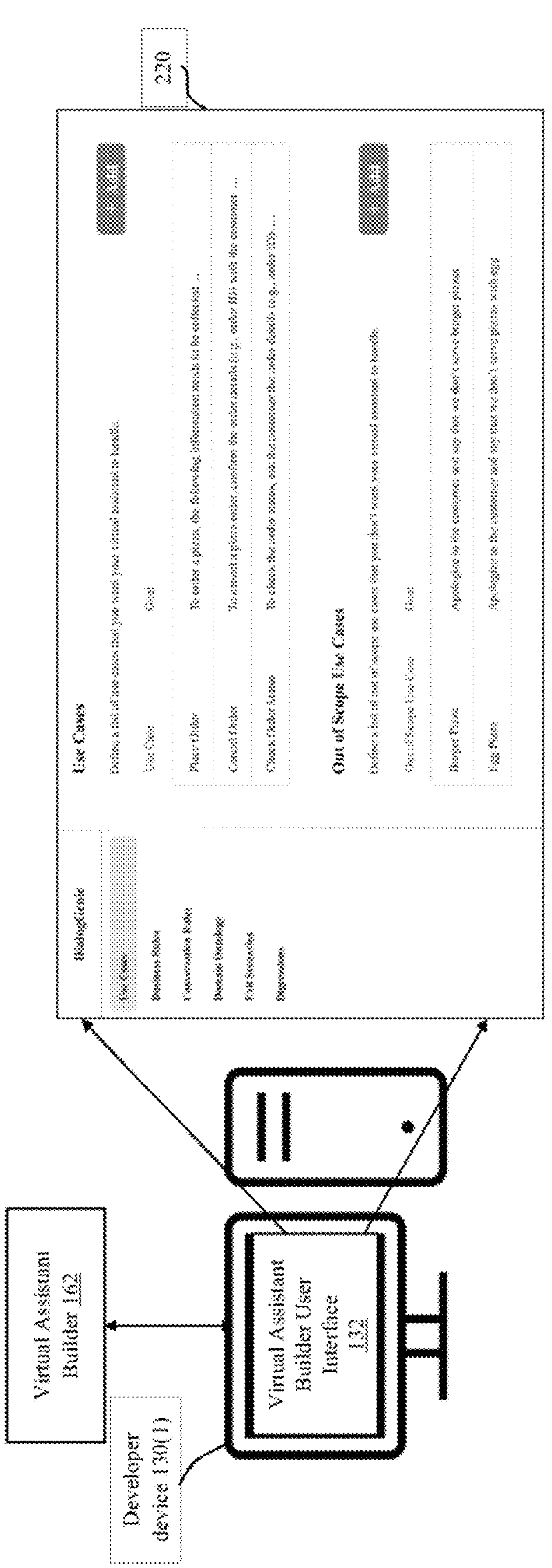
FIG. 2B is another example screenshot of the virtual assistant builder user interface.

FIG. 2B is another example screenshot from the virtual assistant builder UI 132 displaying virtual assistant configuration, for example, in the developer device 130(1). The developer device 130(1) may display the example screenshot in the virtual assistant builder UI 132 based on instructions or information received from the virtual assistant server 150. In this example, the screenshot 220 corresponds to the configuration added to the virtual assistant 174(1)—Pizza Assistant, created using the virtual assistant builder UI 132, although other types and/or numbers of information may be displayed in the virtual assistant builder UI 132 in other configurations.

Figure 2C:
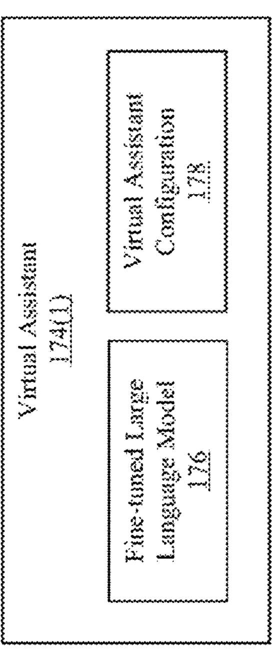
FIG. 2C is a block diagram of a virtual assistant created using the virtual assistant server of FIG. 1.

FIG. 2C is a block diagram of a virtual assistant 174 (1)—a pizza assistant, with the fine-tuned LLM 176 and a virtual assistant configuration 178. The virtual assistant configuration 178 of the virtual assistant 174(1) may be hosted and/or managed by the external server 190 or the virtual assistant server 150, or both the external server 190 and the virtual assistant server 150. The virtual assistant configuration 178 may comprise the dialog flow of the virtual assistant 174(1). The virtual assistant configuration 178 may also include other types and/or numbers of configuration created by the developer or determined by the virtual assistant server 150 or the external server 190.

The LLM 172 is a general-purpose language model, not an enterprise-specific language model. The LLM 172 is not designed to answer questions specific to a single enterprise, as it requires a deep understanding of the enterprise's operations and data to provide accurate answers. However, the fine-tuned LLM 176 of the virtual assistant 174(1)—the Pizza Assistant can understand use cases specific to the Pizza Assistant such as place order, modify order, check delivery status, or the like.

Figure 3A:
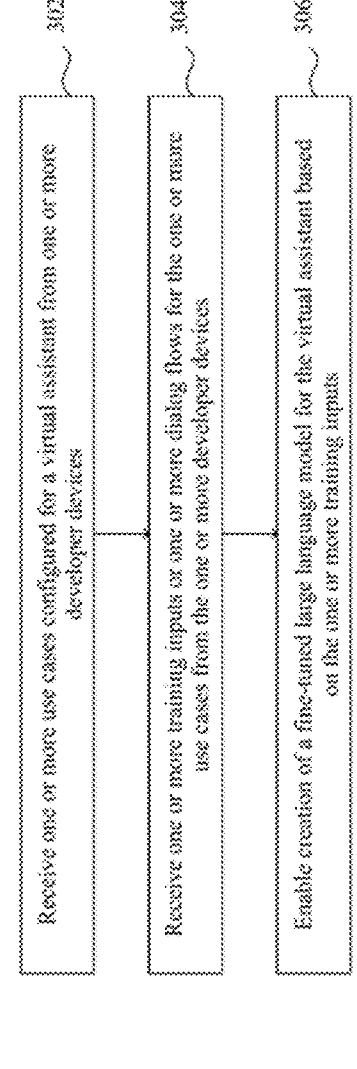
FIG. 3A is a flowchart of an exemplary method for creating a fine-tuned large language model of the one or more virtual assistants created using the virtual assistant server of FIG. 1.

FIG. 3A is a flowchart of an exemplary method 300 for creating a fine-tuned large language model of the one or more virtual assistants 174(1)-174(*n*). The exemplary method 300 may be performed by the system components illustrated in the environment 100 of FIG. 1. In one example, the steps 302-306 may be performed during the design time.

At step 302, the virtual assistant server 150, for the virtual assistant 174(1)—the pizza assistant, may receive one or more use cases configured from the developer device 130(1). In this example, the pizza assistant is for one or more enterprises, such as one or more pizza shops associated with a particular pizza chain that comprise one type of a plurality of types of enterprises. For further illustration, the developer using the developer device 130(1) may configure the pizza assistant for the pizza chain—Acme Pizza. The customers of Acme Pizza may converse with the pizza assistant, by way of example, to: place order, modify order, cancel order, know about offers, delivery status, or the like. In this example, the one or more use cases configured by the developer using the developer device 130(1) may be: place order, modify order, cancel order, although other types and/or numbers of use cases may be configured in other configurations.

At step 304, the virtual assistant server 150 may receive one or more training inputs or one or more dialog flows for the one or more use cases, from the developer device 130(1).

Figure 4A:
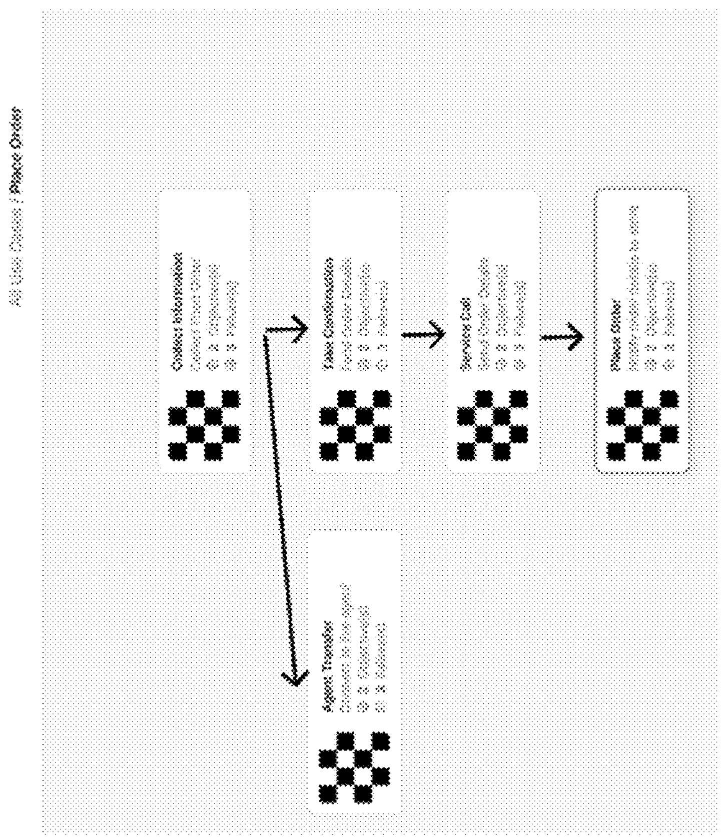
FIG. 4A illustrates an example dialog flow of the use case—place order, configured for a virtual assistant.

FIG. 4A illustrates an example dialog flow of the use case—place order, configured by the developer for the virtual assistant 174(1) using the virtual assistant builder UI 132 rendered in the developer device 130(1). The dialog flow may include nodes such as: collect information, take confirmation, service call, agent transfer, present information, or the like, although there may be other types and/or numbers of nodes in other configurations. To create the dialog flow, two or more of these nodes may be placed, for example, by dragging-and-dropping, in the virtual assistant builder UI 132 and connected by the developer using icons rendered in the virtual assistant builder UI 132. The virtual assistant server 150 executes the configured dialog flow of the use case—place order, to provide one or more responses to the customer devices 134(1)-134(*n*).

Referring back to FIG. 3A, at step 306, the virtual assistant server 150 enables creation of the fine-tuned LLM 176 for the virtual assistant 174(1) based on the one or more training inputs. In this example, the virtual assistant server 150 provides the one or more training inputs to the external server 190, and the external server 190 creates the fine-tuned LLM 176 customized to the pizza assistant of the pizza chain—Acme Pizza, based on the one or more training inputs. In another example, the virtual assistant server 150 may, independently without communicating with the external server 190, create the fine-tuned LLM 176 customized to the pizza assistant of the pizza chain—Acme Pizza.

The types of training inputs for the creation of the fine-tuned LLM 176 may comprise:

(i) Use case labels specific to the enterprise. In the example of the pizza assistant, the use case labels may comprise labels such as, for example, place order, modify order, cancel order, or the like.

(ii) One or more utterances corresponding to each use case label. In the example of the pizza assistant, the utterances corresponding to each use case label may comprise, for example, (a) place order: I would like to order a pizza, get me a pizza; (b) modify order: add a cheese pizza to my existing order, I want to modify the order; (c) cancel order: cancel my latest order, I want to cancel my pizza order, or the like.

(iii) Out-of-domain use case labels that are not specific to the enterprise. In the example of the pizza assistant, the out-of-domain use case labels that are not specific to the pizza chain may comprise, for example, order sushi, find nearby restaurants, order groceries, or the like.

(iv) Business rules specific to the enterprise. In the example of the pizza assistant, the business rules may comprise, for example, do not accept orders post 11 PM, no more than four toppings are allowed on a pizza, no orders below $10 are allowed for delivery, no customisation for combo pizzas, or the like. These business rules may, for example, be specific to the particular enterprise and/or to the enterprises for one of the types of enterprises, such as all pizza shops that are part of the same pizza chain.

(v) Domain knowledge of the field in which the enterprise operates. In the example of the pizza assistant, the domain knowledge may comprise, for example, the types of pizza's served, pizza ingredients, how the pizzas are prepared, ingredient sourcing, nutritional information, allergen guide, enterprise policies, rewards, contact information, or the like. This domain knowledge may be, for example, specific to the particular enterprise and/or to the enterprises for one of the types of enterprises, such as all pizza shops that are part of the same pizza chain.

(vi) Description of one or more entities or objects specific to the use cases configured for the virtual assistant of the enterprise. In the example of the pizza assistant, the entities may comprise, for example, a pizza, the types of bases offered for a pizza (e.g., thin crust, thick crust, deep dish, or stuffed crust), the types of toppings for a pizza (e.g., pepperoni, mushrooms, onions, sausage, olives, bacon, tomatoes, jalapenos, cheese, chicken, etc.), one or more beverages (e.g., hot coffee, cold coffee, cool drink, milk shakes, etc.), one or more desserts (e.g., icecreams, brownies, dough knots, etc.).

An object defined for the virtual assistant comprises a collection of one or more entities. In the example of the pizza assistant, a "food order" is an object, which may include one or more entities selected by a customer such as, for example, a pizza with a base and one or more toppings, one or more beverages, or one or more desserts. This description of the one or more entities or objects may be, for example, specific to the particular enterprise and/or to the enterprises for one of the types of enterprises, such as all pizza shops that are part of the same pizza chain.

Figure 3B:
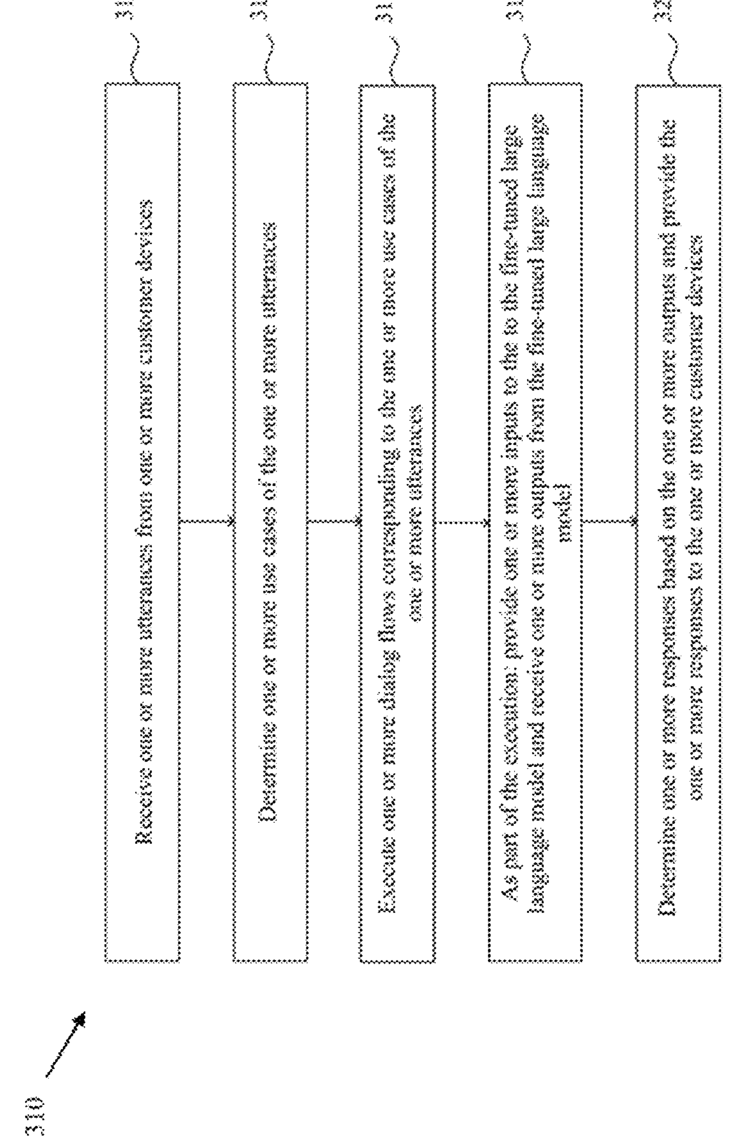
FIG. 3B is a flowchart of an exemplary method for providing responses to customer utterances.

FIG. 3B is a flowchart of an exemplary method 310 for providing responses to customer utterances. The exemplary method 310 may be performed by the system components illustrated in the environment 100 of FIG. 1. In one example, the steps 312-320 of FIG. 3B may be performed during the run-time.

At step 312, the virtual assistant server 150 may receive one or more utterances from the one or more customer devices 134(1)-134(*n*). For example, the virtual assistant server 150 receives an utterance—"I would like to order a pizza" from a customer accessing the pizza assistant at the customer device 134(1).

At step 314, the virtual assistant server 150 determines one or more use cases of the one or more utterances received from the one or more customer devices 134(1)-134(*n*). In this example, the virtual assistant server 150 provides the utterance—"I would like to order a pizza", to the fine-tuned LLM 176 to determine the use case of the utterance. In one example, the virtual assistant server 150 provides a prompt: "determine the use case of the utterance", along with the utterance to the fine-tuned LLM 176, although other types and/or numbers of prompts may be provided to the fine-tuned LLM 176. In this example, the fine-tuned LLM 176 determines the use case of the utterance as "place order" and provides the use case—"place order" to the virtual assistant server 150. In another example, the virtual assistant server 150 may determine the use case of the utterance using the NLP engine 164.

At step 316, the virtual assistant server 150 executes one or more dialog flows corresponding to the determined one or more use cases of the one more utterances. In this example, upon receiving the use case—"place order" from the fine-tuned LLM 176, the virtual assistant server 150 executes the dialog flow of the use case—"place order" illustrated in FIG. 4A.

At step 318, the virtual assistant server 150, as part of execution of the one or more dialog flows, provides one or more inputs to the fine-tuned LLM 176 and receives one or more outputs corresponding to the one or more inputs from the fine-tuned LLM 176. In this example, as part of the execution of the dialog flow of the use case—"place order" illustrated in FIG. 4A, the virtual assistant server 150 provides inputs to the fine-tuned LLM 176 customized to Acme Pizza and receives outputs corresponding to the inputs from the fine-tuned LLM 176. The one or more inputs provided to the fine-tuned LLM 176 comprise one or more prompts and context data, although the one or more inputs may comprise other types and/or numbers of information in other configurations. The context data may comprise text, code, tabular data, images, audio, video, or other types and/or numbers of data in structured or unstructured format.

Figure 4B:
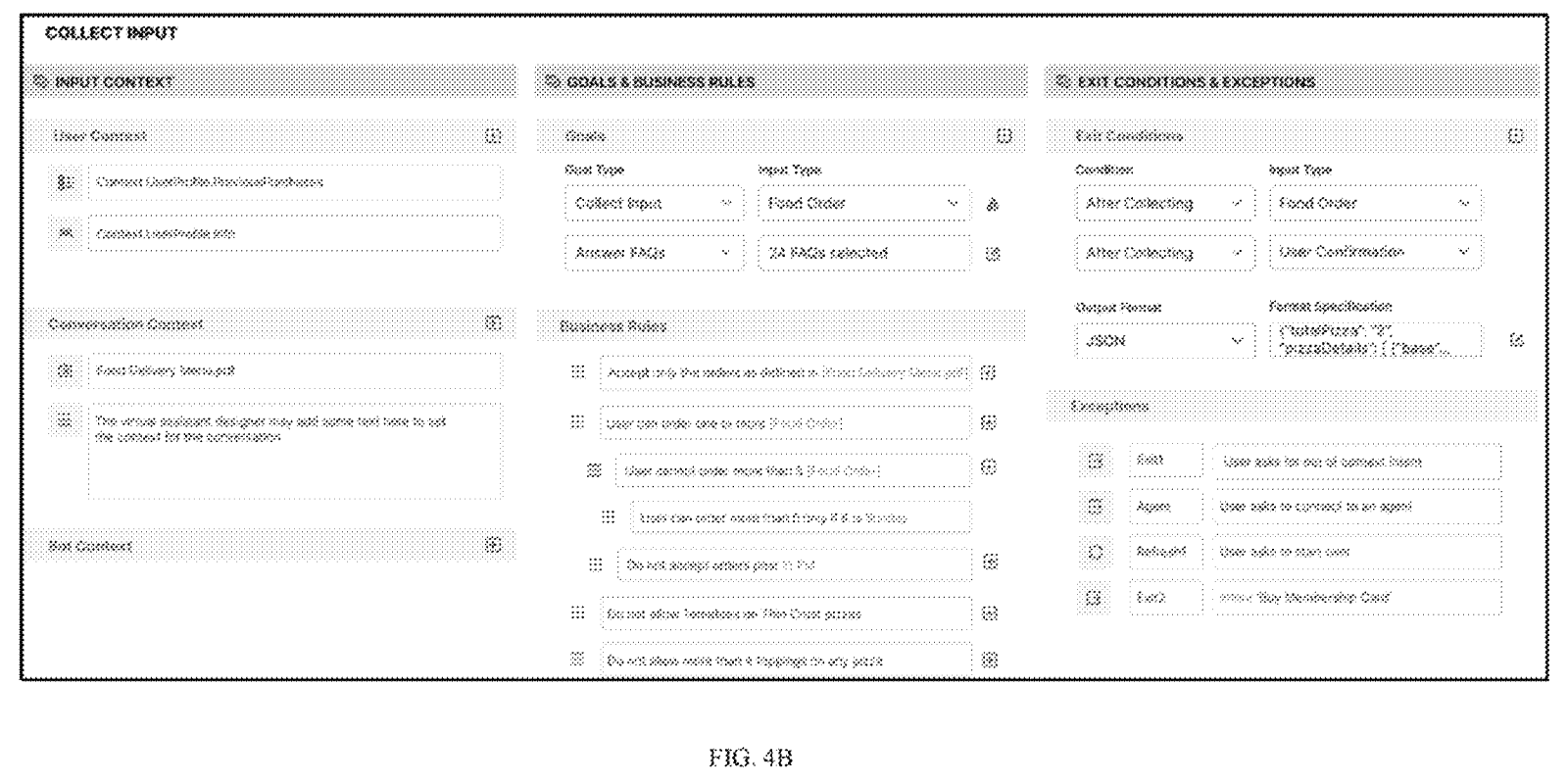

FIG. 4B is an example graphical user interface comprising virtual assistant configuration options which may be provided by the virtual assistant server 150 and rendered on, by way of example, virtual assistant builder UI 132 of the developer device 130(1) In this example, the virtual assistant configuration options that are configured in the "collect information" node of the dialog flow of FIG. 4A are illustrated. In this example, the virtual assistant server 150 provides the inputs comprising: customer/user context, conversation context, goals and business rules, frequently asked questions (FAQ's), exit conditions and exceptions, to the fine-tuned LLM 176. For example, the goal type—"collect input" instructs the fine-tuned LLM 176 to collect information mentioned in the "food order" object. The "exit conditions" provided to the fine-tuned LLM 176 instructs the fine-tuned LLM 176 to provide an output in the "output format" in the "format specification", "after collecting" the "food order".

The virtual assistant configuration options illustrated in FIG. 4B makes it easier for the developer to define the virtual assistant behavior. Instead of defining each prompt and providing corresponding context data, the virtual assistant configuration options enable the developer to easily configure a virtual assistant while abstracting the communication with large language models. The virtual assistant server 150 converts one or more of these virtual assistant configuration options into inputs comprising one or more prompts and context data which are provided to the fine-tuned LLM 176 to drive user conversations. The inputs provided may be in the form of text, code, structured data formats such as JSON, XML, or a combination of two or more of these. In one example, when the user adds the document "food delivery menu.pdf" to the conversation context, the virtual assistant server 150 may provide a pre-defined prompt and the document or the content of the document to the fine-tuned LLM 176, for the fine-tuned LLM 176 to understand the delivery menu of Acme pizza. The conversation context may also comprise conversation history between the customer and the virtual assistant. In another example, when the user adds the object "food order" as the goal, the virtual assistant server 150 may collect the entities in the "food order" object when the "collect input" node is executed. The virtual assistant server 150 may provide the fine-tuned LLM 176: a pre-defined prompt—"collect all the entities listed in the food order object below" and the context data—"food order" object. In one example, "food order" object may list one or more entities or one or more groups of entities as a JSON object. In one example, the prompt may not be pre-defined and may be generated dynamically by the virtual assistant server 150.

The "business rules" virtual assistant configuration option illustrated in FIG. 4B instructs the fine-tuned LLM 176 to provide the output based on the "business rules". In one example, when the business rule is "accept only the orders as defined in food delivery menu," the virtual assistant server provides a pre-defined prompt—Given the business rule "accept only the orders as defined in food delivery menu," please generate a response indicating the steps to ensure compliance with this rule in the food delivery, and the context data comprising content of the food delivery menu.

The "user context" virtual assistant configuration option illustrated in FIG. 4B provides the fine-tuned LLM 176 with context information such as user profile data. The virtual assistant configuration "user context" enables the developer to reference an object or a field, for example, Context.UserProfile. Info. The virtual assistant server 150 retrieves the object or field referenced by the developer and provides the object or the field along with a prompt to the fine-tuned LLM 176. In one example, the prompt may instruct the fine-tuned LLM 176 to consider the data in the object or the field when generating an output to a user utterance.

The "exceptions" virtual assistant configuration option illustrated in FIG. 4B instructs the fine-tuned LLM 176 to provide the output based on the "exceptions". In this example, the fine-tuned LLM 176 provides the output in an exception format specification defined by the developer to the virtual assistant server 150.

As illustrated in FIG. 4B, the exceptions may comprise: the user asking for an out-of-context intent, the user asking to connect to a human agent, the user asking to start over, or a developer specified intent (e.g. use case) detected during the conversation with the user, although there may be other types and/or numbers of exceptions in other configurations. The fine-tuned LLM 176 may detect the exceptions based on a natural language analysis of the utterances provided by the user. In one example, when fine-tuned LLM 176 receives the user utterance—I need help, I want to talk to an agent, the fine-tuned LLM 176 analyses the user utterance and determines that the user is asking to connect to a human agent. Upon determining the exception in the conversation with the user, the fine-tuned LLM 176 may provide the output to the virtual assistant server 150 in the exception format specification. The exception format specification may comprise a textual indication, structured data based indication of the exception determined, or a code-based indication of the exception determined, although the exception format specification may comprise other types and/or numbers of data or content in other configurations. In one example, the textual indication of the exception—the user asking to connect to a human agent, may comprise the text "connect to an agent" in the exception format specification.

The virtual assistant server 150 may continue the conversation with the user based on the exception format specification. In one example, the virtual assistant server 150 may initiate out-of-context intent handling procedure when the exception format specification indicates the user asking for an out-of-context intent, e.g. an out-of-context use case which is not configured by the developer. In another example, the virtual assistant server 150 may transfer the conversation to a human agent of a contact center when the exception format specification indicates the user asking to connect to a human agent. In another example, the virtual assistant server 150 may delete any current conversation context and start over the conversation with the user when the exception format specification indicates the user asking to start over. In another example, the virtual assistant server 150 may initiate a dialog flow corresponding to the developer specific intent (e.g. buy membership card use case) when the exception format specification indicates the developer specific intent detected during the conversation with the user. In this manner, the virtual assistant server 150 handles any exceptions determined during the conversation with the user.

In one example, the developer at the developer device 134(1) configures the inputs to be provided to the fine-tuned LLM 176 when the "collect information" node is executed. One or more of the example inputs, illustrated in the FIG. 4B, provided to the fine-tuned LLM 176 are dynamic. For example, for a delivery, the "food order" object may change based on the real-time availability of menu items at the store closest to the customer location which is part of the "input context". As the inputs provided are dynamic, the fine-tuned LLM 176 provides the output based on latest or real-time information and hence improves customer experience and customer satisfaction. In one example, a pizza shop of a pizza chain may accept orders for delivery until 9 PM and another pizza shop of the pizza chain may accept order for delivery until 10 PM. Such inputs specific to the pizza shop accepting the order may be provided to the fine-tuned LLM 176 during the execution of the dialog flow.

The virtual assistant server 150 may dynamically modify: the goal type, the input type, the business rules, the exit conditions, or the exceptions based on the user context or the conversation context. In one example, when the context.userprofile.info indicates that the customer is a "platinum customer", the business rule—"user cannot order more than 5 [Food Order]" may be removed and the customer may be allowed to order any number of Pizzas. In this example, the number of FAQs selected in the "input type" may be more or different for "platinum customer".

In this manner, the virtual assistant server 150 may dynamically modify one or more inputs provided to the fine-tuned LLM 176 based on the user context, the conversation context, an execution stage of the dialog flow, previous conversations with the customer, the likelihood that the reaches an execution stage of the dialog flow, or the like. In one example, the virtual assistant server 150 may dynamically modify the one or more inputs provided to the fine-tuned LLM 176 based on the likelihood that the customer will complete the objective of the "place order" node of the dialog flow illustrated in FIG. 4A.

As illustrated in the "exit conditions" of FIG. 4B, after the fine-tuned LLM 176 collects the "food order", the fine-tuned LLM 190 outputs information in the "output format" to the virtual assistant server 150. Upon receiving the output information in the "output format," the virtual assistant server 150 advances through the dialog flow of FIG. 4A to execute the subsequent node—"take confirmation". The subsequent node "service call" may be executed by the virtual assistant server 150 based on the output provided by the fine-tuned LLM 176 when the "take confirmation" node is executed. The subsequent node "place order" may be executed by the virtual assistant server 150 based on the information received by executing the "service call" node.

Referring back to FIG. 3B, at step 320, the virtual assistant server 150 determines one or more responses based on the one or more outputs and provides the one or more responses to the one or more customer devices 134(1)-134(*n*). In this example, the virtual assistant server 150 receives the output from the fine-tuned LLM 176 based on the execution of the "place order" node and provides a response to the customer. During the execution of the dialog flow illustrated in FIG. 4A, the virtual assistant server 150 converses with the customer device 134(1) with the assistance of the fine-tuned LLM 176 and enables the customer at the customer device 134(1) place an order for the pizza.

The fine-tuned LLM 176 may be created by ingesting enterprise information such as: enterprise documents comprising: security policies, privacy policies, workflow processes, business rules, articles, whitepapers, patents, FAQs, financial reports, product documentation, etc. In one example, if the enterprise documents comprise images, for ingestion, the context of the image but not the text from the image is extracted, so that the image can be presented as a response to a customer query instead of text. In another example, historical chat transcripts or conversation transcripts may be used as training inputs to fine-tune the LLM 172.

Having thus described the basic concept of the invention, it will be rather apparent to those skilled in the art that the foregoing detailed disclosure is intended to be presented by way of example only, and is not limiting. Various alterations, improvements, and modifications will occur and are intended for those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method comprising:

determining, by a virtual assistant server, one or more use cases of one or more customer inputs received from a customer device as part of an online interaction with a virtual assistant managed by the virtual assistant server;

executing, by the virtual assistant server, a plurality of nodes of one or more dialog flows corresponding to the one or more use cases, wherein the executing comprises:

generating a structured input object from a plurality of prompt inputs comprising: a use case context, a customer context, a conversation context, a plurality of business rules, and a plurality of exit conditions, wherein the plurality of prompt inputs are determined based on: the one or more customer inputs and a configuration of a node of one of the dialog flows currently under execution;

providing the structured input object to a fine-tuned language model to continue the online interaction; and receiving one or more structured outputs corresponding to the plurality of prompt inputs from the fine-tuned language model when at least one of the plurality of exit conditions are satisfied, wherein the one or more structured outputs are generated by the fine-tuned language model based on patterns learned from training data comprising: one or more use case labels; one or more training customer inputs corresponding to the one or more use case labels; description of one or more entities corresponding to the one or more use case labels; description of one or more entity objects corresponding to the one or more use case labels; domain knowledge corresponding to the one or more use case labels; and a plurality of training business rules corresponding to at least one of: the one or more use case labels; the one or more entities corresponding to the one or more use case labels; or the one or more entity objects corresponding to the one or more use case labels;

determining, by the virtual assistant server, one or more responses by executing one or more subsequent nodes to the plurality of nodes of the one or more dialog flows based on the one or more structured outputs received from the fine-tuned language model; and providing, by the virtual assistant server, the one or more responses to the customer device.

2. The method of claim 1, wherein one or more of the plurality of training business rules are overruled based on at least one of: the customer context, the conversation context, or the node of one of the dialog flows currently under execution.

3. The method of claim 1, wherein the structured input object comprises at least one of: an executable code or a JavaScript Object Notation (JSON).

4. The method of claim 1, wherein the one or more structured outputs received from the fine-tuned language model are in an output data format specified in one of the plurality of exit conditions, and wherein the output data format comprises at least one of: an executable code or a JavaScript Object Notation (JSON).

5. The method of claim 1, wherein the one or more structured outputs comprise a code-based indication of an exception determined in the online interaction.

6. A virtual assistant server comprising:

one or more processors; and a memory coupled to the one or more processors which are configured to execute programmed instructions stored in the memory to:

determine one or more use cases of one or more customer inputs received from a customer device as part of an online interaction with a virtual assistant managed by the virtual assistant server;

execute a plurality of nodes of one or more dialog flows corresponding to the one or more use cases, wherein the executing comprises:

generating a structured input object from a plurality of prompt inputs comprising: a use case context, a customer context, a conversation context, a plurality of business rules, and a plurality of exit conditions, wherein the plurality of prompt inputs are determined based on: the one or more customer inputs and a configuration of a node of one of the dialog flows currently under execution;

providing the structured input object to a fine-tuned language model to continue the online interaction; and receiving one or more structured outputs corresponding to the plurality of prompt inputs from the fine-tuned language model when at least one of the plurality of exit conditions are satisfied, wherein the one or more structured outputs are generated by the fine-tuned language model based on patterns learned from training data comprising: one or more use case labels; one or more training customer inputs corresponding to the one or more use case labels; description of one or more entities corresponding to the one or more use case labels; description of one or more entity objects corresponding to the one or more use case labels; domain knowledge corresponding to the one or more use case labels; and a plurality of training business rules corresponding to at least one of: the one or more use case labels; the one or more entities corresponding to the one or more use case labels; or the one or more entity objects corresponding to the one or more use case labels;

determine one or more responses by executing one or more subsequent nodes to the plurality of nodes of the one or more dialog flows based on the one or more structured outputs received from the fine-tuned language model; and provide the one or more responses to the customer device.

7. The virtual assistant server of claim 6, wherein one or more of the plurality of training business rules are overruled based on at least one of: the customer context, the conversation context, or the node of one of the dialog flows currently under execution.

8. The virtual assistant server of claim 6, wherein the structured input object comprises at least one of: an executable code or a JavaScript Object Notation (JSON).

9. The virtual assistant server of claim 6, wherein the one or more structured outputs received from the fine-tuned language model are in an output data format specified in one of the plurality of exit conditions, and wherein the output data format comprises at least one of: an executable code or a JavaScript Object Notation (JSON).

10. The virtual assistant server of claim 6, wherein the one or more structured outputs comprise a code-based indication of an exception determined in the online interaction.

11. A non-transitory computer-readable medium storing instructions which when executed by one or more processors, causes the one or more processors to:

determine one or more use cases of one or more customer inputs received from a customer device as part of an online interaction with a virtual assistant managed by the virtual assistant server, execute a plurality of nodes of one or more dialog flows corresponding to the one or more use cases, wherein the executing comprises:

generating a structured input object from a plurality of prompt inputs comprising: a use case context, a customer context, a conversation context, a plurality of business rules, and a plurality of exit conditions, wherein the plurality of prompt inputs are determined based on: the one or more customer inputs and a configuration of a node of one of the dialog flows currently under execution;

providing the structured input object to a fine-tuned language model to continue the online interaction; and receiving one or more structured outputs corresponding to the plurality of prompt inputs from the fine-tuned language model when at least one of the plurality of exit conditions are satisfied, wherein the one or more structured outputs are generated by the fine-tuned language model based on patterns learned from training data comprising: one or more use case labels; one or more training customer inputs corresponding to the one or more use case labels; description of one or more entities corresponding to the one or more use case labels; description of one or more entity objects corresponding to the one or more use case labels; domain knowledge corresponding to the one or more use case labels; and a plurality of training business rules corresponding to at least one of: the one or more use case labels; the one or more entities corresponding to the one or more use case labels; or the one or more entity objects corresponding to the one or more use case labels;

determine one or more responses by executing one or more subsequent nodes to the plurality of nodes of the one or more dialog flows based on the one or more structured outputs received from the fine-tuned language model; and provide the one or more responses to the customer device.

12. The non-transitory computer-readable medium of claim 11, wherein one or more of the plurality of training business rules are overruled based on at least one of: the customer context, the conversation context, or the node of one of the dialog flows currently under execution.

13. The non-transitory computer-readable medium of claim 11, wherein the structured input object comprises at least one of: an executable code or a JavaScript Object Notation (JSON).

14. The non-transitory computer-readable medium of claim 11, wherein the one or more structured outputs received from the fine-tuned language model are in an output data format specified in one of the plurality of exit conditions, and wherein the output data format comprises at least one of: an executable code or a JavaScript Object Notation (JSON).

15. The non-transitory computer-readable medium of claim 11, wherein the one or more structured outputs comprise a code-based indication of an exception determined in the online interaction.

* * * * *